July 28, 1970  W. NIEMEYER  3,521,879
APPARATUS FOR SINGLING STACKED TUBE SECTIONS OF
PAPER OR PLASTICS MATERIAL SHEETING
Filed Jan. 24, 1968  4 Sheets-Sheet 1

INVENTOR
Willy NIEMEYER

By Stevens, Davis, Miller & Mosher
ATTORNEYS

July 28, 1970　　　　　W. NIEMEYER　　　　　3,521,879
APPARATUS FOR SINGLING STACKED TUBE SECTIONS OF
PAPER OR PLASTICS MATERIAL SHEETING
Filed Jan. 24, 1968　　　　　　　　　　　　4 Sheets-Sheet 2

INVENTOR
Willy NIEMEYER

By

ATTORNEYS

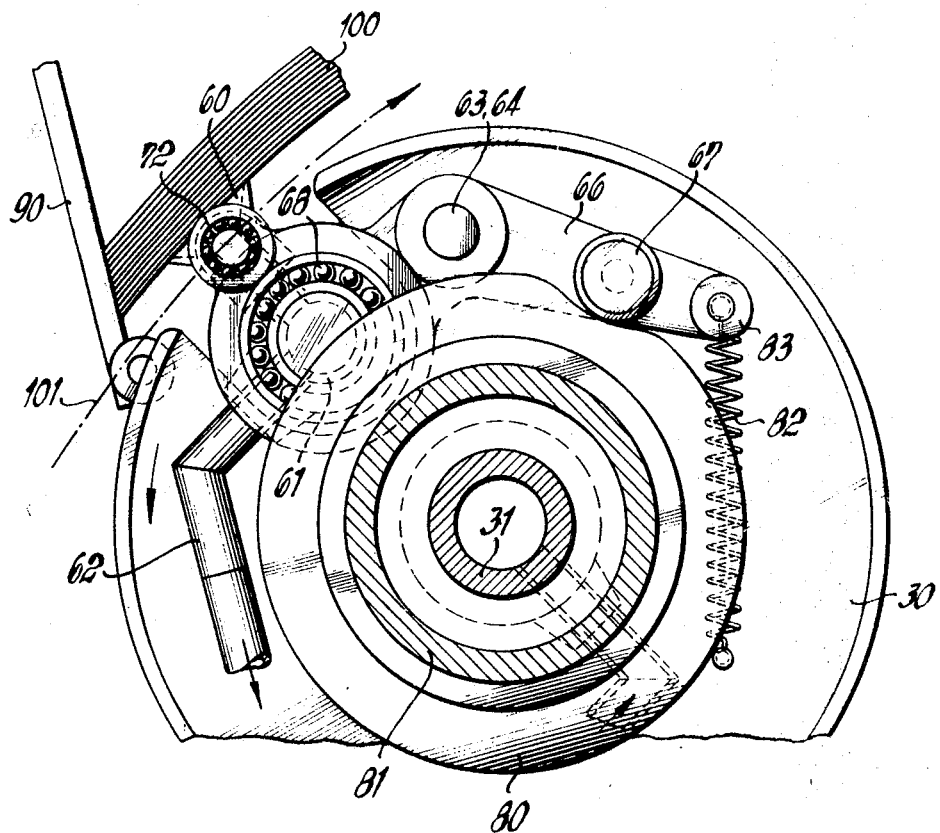

United States Patent Office 3,521,879
Patented July 28, 1970

3,521,879
APPARATUS FOR SINGLING STACKED TUBE SECTIONS OF PAPER OR PLASTICS MATERIAL SHEETING
Willy Niemeyer, Natrup-Hagen, Westphalia, Germany, assignor to Windmoller & Holscher, Lengerich, Westphalia, Germany
Filed Jan. 24, 1968, Ser. No. 700,205
Claims priority, application Germany, Feb. 13, 1967, W 43,347
Int. Cl. B65h *3/08, 1/06*
U.S. Cl. 271—27
8 Claims

ABSTRACT OF THE DISCLOSURE

A stack of workpieces is supported by a set of rollers, which revolve along a cylindrical path about a common axis and have a common cylindrical envelope. At least one of the rollers has a circumference which is larger than the width of the widest tube sections to be singled and rotates about its own axis in a sense which is opposite to the sense of rotation of the rollers about the common axis. Said one roller is provided with at least one vacuum cup for sucking and entraining the lowermost tube section in the stack. The tube section is transferred at a transfer station to a forwarding device. The vacuum cups are movable in the withdrawing station to protrude from the cylindrical envelope of the revolving rollers.

---

Figure 1:
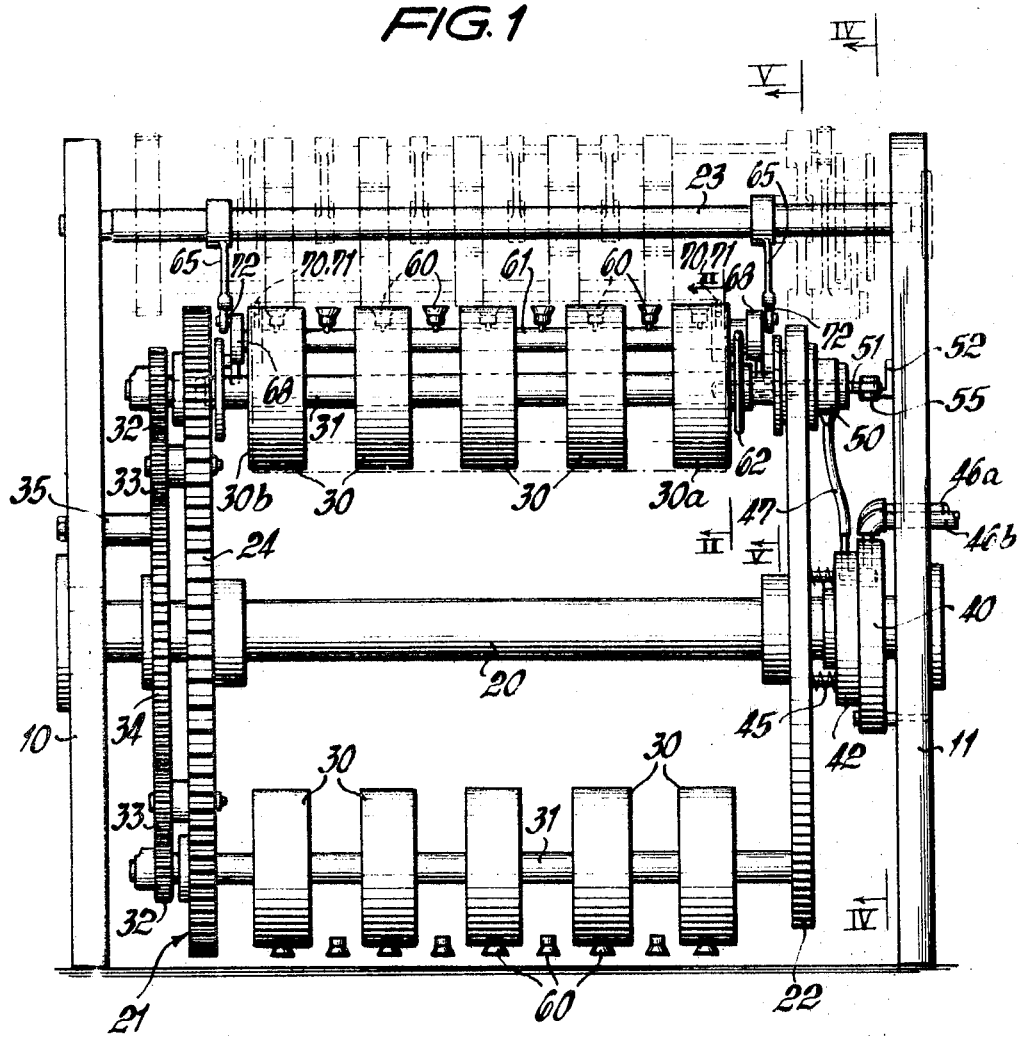

The German patent specification 900,815 discloses an apparatus for singling stacked tube sections. In that apparatus, a stack of workpieces is supported by a set of rollers, which revolve along a cylindrical path about a common axis and have a common cylindrical envelope; at least one of the rollers has a circumference which is larger than the width of the widest tube sections to be singled and rotates about its own axis in a sense which is opposite to the sense of rotation of the rollers about the common axis; said one roller is provided with at least one vacuum cup for sucking and entraining the lowermost tube section in the stack; and the tube section is transferred at a transfer station to a device, which is provided with grippers and forwards the tube section, e.g., to an end-laying machine which folds the tube section to form bag ends thereon.

In the operation of the known apparatus, trouble often occurs in the singling of workpieces which are not sufficiently flexible, such as multi-layer or multi-ply bag workpieces. In this case the stack of workpieces is not always sufficiently in contact with the support formed by the revolving rollers so that the vacuum openings in the rollers do not sufficiently act on the lowermost workpiece.

It is an object of the invention so to improve an apparatus of the type defined first hereinbefore that it can be used also to single tube sections which have a relatively low flexibility, particularly multi-layer tube sections.

In an apparatus of the type defined first hereinbefore, this object is accomplished in that the vacuum cups are movable in the withdrawing station to protrude from the cylindrical envelope of the revolving rollers. When the vacuum cups are in their outermost position, they move somewhat outwardly beyond the cylindrical envelope so that they reliably engage the lowermost tube section.

In a development of the invention, the vacuum cups are connected to the associated rollers with the aid of levers, which are pivoted on axes that are parallel to the axis of the respective roller and by their co-action with a stationary cam are held in their retracting position during the revolution of the rollers except for the angular range in which the vacuum cups are adjacent to the cylindrical envelope, whereas the levers are spring-urged toward their extending position. At the station where the workpieces are transferred to rotating grippers, which revolve along a path that contacts the cylindrical envelope, a device for retaining the vacuum cups in their withdrawn position may be provided. It would not be desirable if the vacuum cups protruded beyond the cylindrical envelope in this transfer station under the combined action of the cam and the springs because the vacuum cups would then be subjected to heavy wear by chafing on other machine parts. The object to prevent a protruding of the vacuum cups in the transfer station has been accomplished by the inventor in a simple manner in that the outward movement of the vacuum cups is effected by a spring so that their outward movement in the transfer station can easily be prevented against the force of a spring and without need for complicated different provisions, such as a rotation of the stationary cam or the like. In this connection it is particularly desirable if, according to the invention, the retaining device cooperates with the outer races of antifriction bearings and the inner races of said bearings are carried by a member which is connected to the vacuum cups. In this way, a wear due to the friction between the retaining device and the member which carries the vacuum cups is also avoided.

In a development of the invention, the vacuum cups may be carried by rods, which are freely rotatably mounted in the pivoted levers, and the vacuum cups may be guided to move radially to the axes of the rollers by guide pins, which enter bores of the rollers. Whereas the vacuum cups are moved by the pivoted lever, the above-described feature ensures that the vacuum cups perform a rectilinear, outwardly directed movement. This is suitable to ensure a good contact with the lowermost workpiece.

According to a further feature of the invention, the desired drive can be imparted to the rollers in that the rollers are revolved about the common axis and rotated about their own axes at the same time by the planet gears of an epicyclic gear train.

To prevent a mutual interference of the vacuum cups of adjacent rollers owing to the failure to maintain a vacuum at the vacuum cups of the rollers disposed between the withdrawing station and the transfer station when the vacuum openings of the one roller are exposed, it is suitable according to the invention to connect separate vacuum pumps to the vacuum cups of each of the rollers disposed between the withdrawing station and the transfer station. To ensure the required exact control of the vacuum, the revolving vacuum conduits leading to the vacuum cups may incorporate control valves, which cooperate with stationary control cams.

The invention will be explained more fully hereinafter with reference to the drawing, in which an embodiment of the apparatus according to the invention is shown by way of example.

Figure 2:
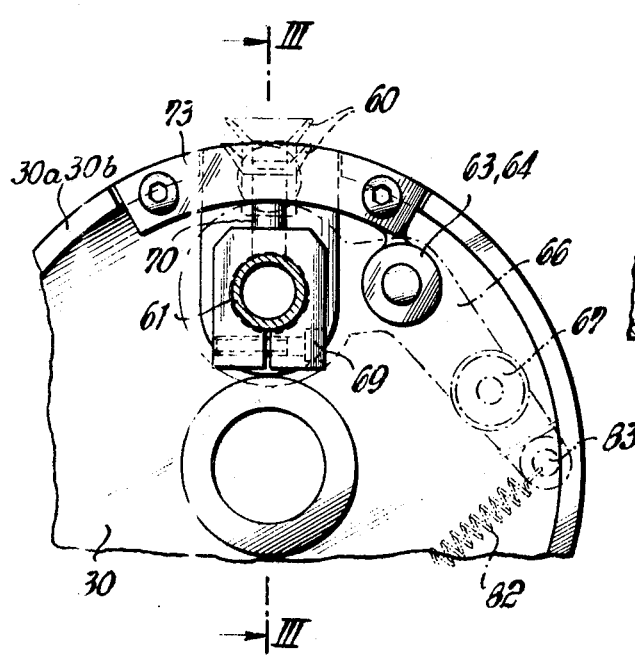
Figure 3:
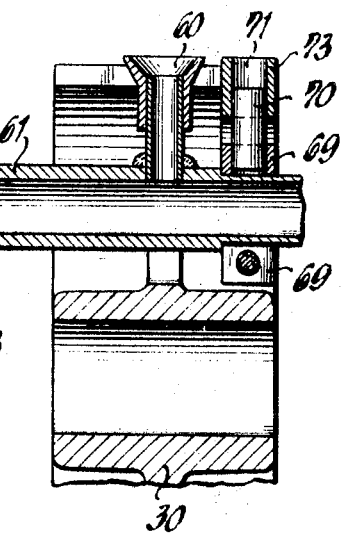
Figure 4:
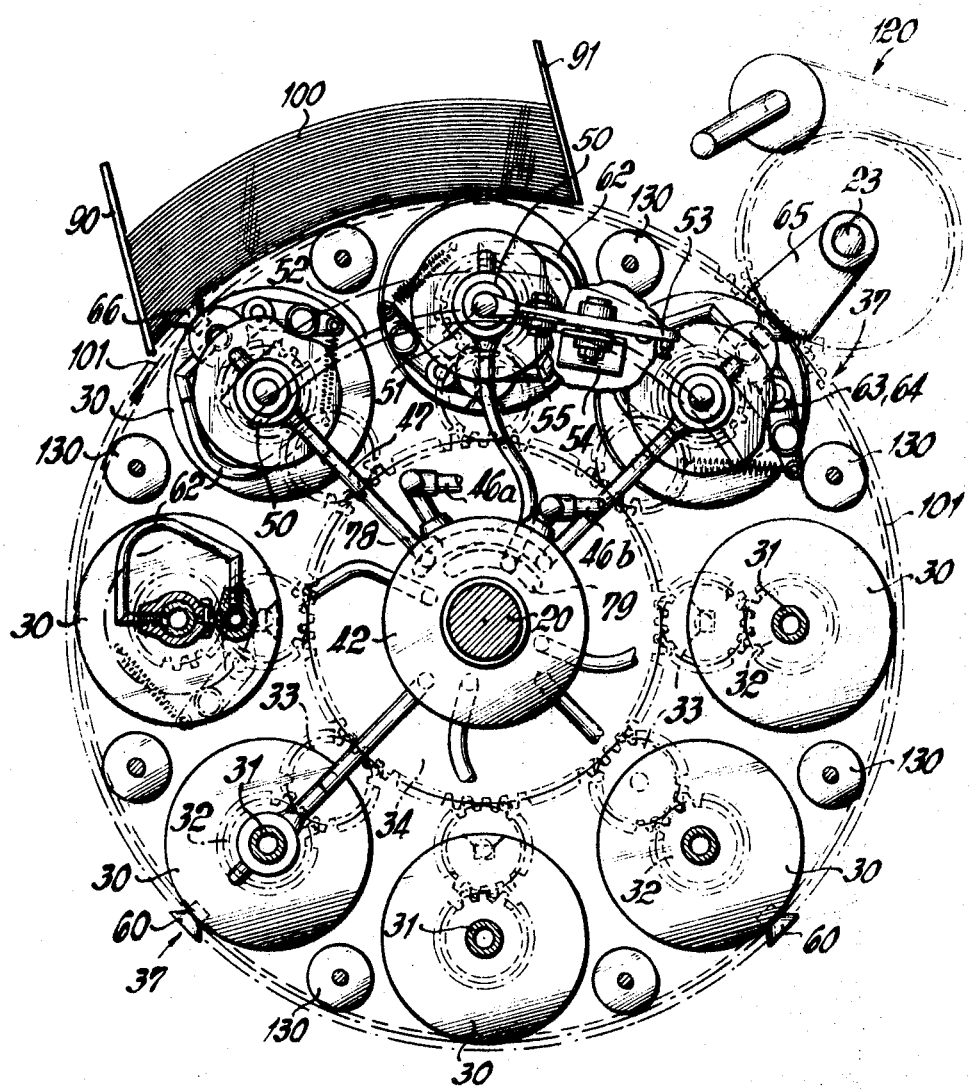

FIG. 1 is a fragmentary top plan view showing a machine which is provided with the vacuum and gripping apparatus according to the invention, FIG. 2 is a sectional view taken on line II—II of the machine of FIG. 1, FIG. 3 is a sectional view taken on line III—III of FIG. 2, FIG. 4 is a sectional view taken on line IV—IV of FIG. 1, and FIG. 5 is an enlarged sectional view taken on line V—V in FIG. 1.

A machine frame comprises two side walls 10, 11 in FIG. 1 and is stiffened by cross-members, not shown. A shaft 20 is rotatably mounted in the machine frame and has two carrying discs 21, 22 secured to it. One carrying disc 21 has a gear rim 24, which is driven, e.g., by a drive motor, not shown. Rollers 30 are disposed between the carrying discs 21, 22 on a circle which is concentric with the shaft 20, and have roller shafts 31, which are rotatably mounted in the carrying discs 21, 22. The roller shafts 31 are provided with gears 32, which constitute planet gears. Idlers 33 mesh with the planet gears and with a sun gear 34 so that the gears 32, 33, 34 form a gear train.

The sun gear 34 is arranged coaxially with the shaft 20 and is firmly connected to the side wall 10 by a spacing pin 35. A control valve disc 40 is coaxial to the shaft 20 and fixed to the side wall 11. A second control valve disc 42 is arranged to rotate with the carrying disc 22 and the shaft 20 and is axially displaceable. Compression springs 45 disposed between the carrying disc 22 and the control valve disc 42 hold the latter in self-sealing contact with the control valve disc 40.

The control valve discs 42, 40 are connected by two conduits 46a and 46b to respective vacuum pumps, not shown. These connections are so arranged and the flow of air is so controlled by two arcuate slots 78, 79 (FIG. 4) in the valve disc 40 that each of the vacuum control units 37 disposed in the area from the station for withdrawing the tube sections 100 to the station for transferring said tube sections is connected to a separate vacuum pump. As the control for the eight vacuum control units 37 must be most exact in order to ensure a satisfactory operation, a fine adjustment is effected by additional control valves 51, which are disposed at each vacuum control unit 37 and connected to fittings 50 for conduits 47 leading to the valve disc 42. Each of these control valves 51 has associated with it a control lever 53, which is pivoted in a bearing block 54. Each control lever 53 is provided with a follower roller 55, which is adapted to bear on the cam segment 52. The cam segment 52 has such a peripheral length that the control valve 51 is opened until the respective vacuum control unit 37 has performed a complete revolution of its own about the shaft 31 from the time when the suction cups 60 have begun to withdraw a tube section 100 to the time when they have reached the transfer station. When the cam follower 55 has reached the end of the cam segment 52, a spring, not shown, returns the control lever 53 to its initial position so that the control valve 51 is closed. The initial position of the control lever 53 may be defined by an adjusting screw.

The vacuum cups 60 are mounted on a carrying rod 61 (FIG. 3), which is hollow because it forms part of the vacuum conduit. Each rod 61 is connected by a preferably flexible conduit 62 to the hollow end of the respective roller shaft 31.

The carrying rods 61 for the vacuum cups 60 are pivoted to the rollers 30 on vacuum cup stub shafts 63, 64, which are parallel to the roller shafts 31. The pivotal movement about these stub shafts 63 and 64 is positively and frictionally controlled in that a pivoted lever 66 is provided with a cam follower roller 67, which rolls on a camwheel 80 and is urged against the latter by a tension spring 82 connected to the end 83 of the pivoted lever.

The carrying rods 61 are rotatably mounted in the pivoted lever 66 by means of a ball bearing 68. Two guide pins 70 are secured to each carrying rod 61 by respective clamping members 69 and guided in a bore 71 of a guide member 73, which is connected to the two outer rollers 30a and 30b of the set so that the carrying rods 61 are held against rotation. This arrangement ensures a reliable engagement of each tube section 100 because the suction cup 60 is constrained by the guide pins 70 to move along a straight line toward the workpieces 100 to be engaged rather than on the arc of a circle defined by the pivoted lever 66. As the pivotal movement gives rise to both vertical and horizontal components of motion, the bore 71 is so large that the pin 70 can assume the inclination which is due to the horizontal component of motion.

As is apparent from FIG. 4, where the machine frame is only diagrammatically indicated, there are eight roller sets. With the selected transmission ratio between the sun gear and the planet gears, each roller set performs four revolutions during each complete revolution of the central gear 24. During each full revolution of the central gear 24, the carrying rods 61 and the suction cups 60 carried by them protrude also four times from the periphery of the circle which is defined by the periphery of the rollers. At the station where the singled tube sections 100 are transferred to a device 120 for their further processing, the vacuum cups should not protrude from the periphery of the rollers 30 because vacuum cups protruding in that station would chafe on other machine parts and would thus become inoperative in the course of time. To prevent this, two segments 65 disposed adjacent to the device 120 for further processing are secured to the shaft 23 and continuously revolve on a circular path (FIGS. 1 and 4). Each of these segments bears on a ball bearing 72, which is mounted at each end of a carrying rod 61, so that each carrying rod 61 is urged back at said station against the force of the spring 82 (FIGS. 1 and 5). The further components of a transfer device are also mounted on the shaft 23. As these components do not belong to the invention they are not described in detail and are only diagrammatically indicated in the drawings.

The camwheels 80 are secured to hollow shafts 81, which are coaxial to the roller shafts 31. The camwheels 80 are non-rotatable relative to the carrying disc 22.

The workpieces, such as tube sections 100 to be formed into bags, are guided on their sides by a stack guide 90, 91 so that the workpieces can adapt themselves to the radius of curvature of the circle on which the rollers revolve. The workpieces bear on the rollers 30 and additional guide rollers 130. These guide rollers are freely rotatably mounted between the carrying discs 21, 22 in such a manner that the peripheral surfaces of the guide rollers 130 just contact the circle 101.

A forwarding and/or processing device 120, which is no part of the invention, is in indirect operative connection with the gear rim 24. The vacuum cup apparatus according to the invention enables a reliable engagement of workpieces having different degrees of flexibility and a trouble-free forwarding of such workpieces to the processing devices. A most reliable removal of the tube sections for use in making bags from a stack of such tube sections by vacuum action is ensured with extremely simple means.

What is claimed is:

1. Apparatus for singling stacked tube sections, in which a stack of workpieces is supported by a set of rollers, which revolve along a cylindrical path about a common axis and have a common cylindrical envelope; at least one of the rollers has a circumference which is larger than the width of the widest tube sections to be singled and rotates about its own axis in a sense which is opposite to the sense of rotation of the rollers about the common axis; said one roller is provided with at least one vacuum cup for sucking and entraining the lowermost tube section in the stack; and the tube section is transferred at a transfer station to a forwarding device, characterized in that the vacuum cups are movable in the withdrawing station to protrude from the cylindrical envelope of the revolving rollers.

2. Apparatus according to claim 1, characterized in that the rollers are revolved about the common axis and rotated about their own axes at the same time by the planet gears of an epicyclic gear train.

3. Apparatus according to claim 1, characterized in that separate vacuum pumps are connected to the vacuum cups of each of the rollers disposed between the withdrawing station and the transfer station.

4. Apparatus according to claim 3, characterized in that the revolving vacuum conduits leading to the vacuum cups incorporate control valves, which cooperate with stationary control cams.

5. Apparatus according to claim 1, characterized in that the vacuum cups are connected to the associated rollers with the aid of levers, which are pivoted on axes that are parallel to the axis of the respective roller and by their co-action with a stationary cam are held in their retracting position during the revolution of the rollers except for the angular range in which the vacuum cups are adjacent to the cylindrical envelope, whereas the levers are spring-urged toward their extending position.

6. Apparatus according to claim 5, characterized in that a device for retaining the vacuum cups in their withdrawn position is provided at the station where the workpieces are transferred to rotating grippers, which revolve on a path that contacts the cylindrical envelope.

7. Apparatus according to claim 6, characterized in that the retaining device cooperates with the outer races of anti-friction bearings and the inner races of said bearings are carried by a member which is connected to the vacuum cups.

8. Apparatus according to claim 5, characterized in that the vacuum cups are carried by rods, which are freely rotatably mounted in the pivoted levers, and the vacuum cups are guided to move radially to the axes of the rollers by guide pins, which enter bores of the rollers.

References Cited

FOREIGN PATENTS 900,815   1/1954   Germany.

EDWARD A. SROKA, Primary Examiner

U.S. Cl. X.R.

271—41